(12) United States Patent
Yamada et al.

(10) Patent No.: US 8,721,992 B2
(45) Date of Patent: May 13, 2014

(54) MICRO FLUIDIC DEVICE

(75) Inventors: Takayuki Yamada, Kanagawa (JP);
Masaki Hirota, Kanagawa (JP);
Kazuaki Tabata, Kanagawa (JP);
Seiichi Takagi, Kanagawa (JP)

(73) Assignee: Fuji Xerox Co., Ltd, Tokyo (JP)

( * ) Notice: Subject to any disclaimer, the term of this patent is extended or adjusted under 35 U.S.C. 154(b) by 614 days.

(21) Appl. No.: 11/905,931

(22) Filed: Oct. 5, 2007

(65) Prior Publication Data
US 2008/0240987 A1   Oct. 2, 2008

(30) Foreign Application Priority Data
Mar. 27, 2007   (JP) ................. 2007-080768

(51) Int. Cl.
*B01L 3/00*   (2006.01)
*G01N 1/10*   (2006.01)

(52) U.S. Cl.
USPC ........... 422/503; 422/501; 422/502; 422/504; 436/180

(58) Field of Classification Search
USPC ...................... 422/99, 100, 500–505; 436/180
See application file for complete search history.

(56) References Cited

U.S. PATENT DOCUMENTS

| | | |
|---|---|---|
| 3,424,437 A | 1/1969 | Shearer |
| 3,860,217 A | 1/1975 | Grout |
| 4,050,676 A | 9/1977 | Morishima et al. |
| 5,061,544 A | 10/1991 | Wada et al. |
| 5,087,330 A | 2/1992 | Wada et al. |
| 5,783,129 A | 7/1998 | Shirai et al. |
| 5,938,333 A | 8/1999 | Kearney |
| 6,082,891 A | 7/2000 | Schubert et al. |
| 6,186,660 B1 * | 2/2001 | Kopf-Sill et al. ............. 366/340 |
| 6,245,249 B1 | 6/2001 | Yamada et al. |
| 6,355,173 B1 | 3/2002 | Den Bieman et al. |
| 6,361,824 B1 | 3/2002 | Yekimov et al. |
| 6,368,871 B1 * | 4/2002 | Christel et al. ................ 436/180 |
| 6,616,327 B1 | 9/2003 | Kearney et al. |
| 6,818,394 B1 | 11/2004 | O'Donnell-Maloney et al. |
| 7,449,159 B2 | 11/2008 | Nomura et al. |
| 8,147,121 B2 | 4/2012 | Lacy et al. |
| 2002/0058332 A1 | 5/2002 | Quake et al. |
| 2003/0008308 A1 * | 1/2003 | Enzelberger et al. ............. 435/6 |
| 2004/0213083 A1 | 10/2004 | Fujiwara et al. |
| 2005/0163701 A1 | 7/2005 | Tonkovich et al. |
| 2005/0167354 A1 | 8/2005 | Caze et al. |

(Continued)

FOREIGN PATENT DOCUMENTS

| | | |
|---|---|---|
| EP | 1 481 724 A1 | 12/2004 |
| EP | 1 577 000 A2 | 9/2005 |

(Continued)

OTHER PUBLICATIONS

Apr. 9, 2012 Office Action issued in U.S. Appl. No. 12/185,464.

(Continued)

*Primary Examiner* — Dean Kwak
(74) *Attorney, Agent, or Firm* — Oliff PLC (57) ABSTRACT

A micro fluidic device comprises a micro channel in which a plurality of fluids form laminar flows and are supplied, wherein an inner wall of the micro channel comprise a protruding part that is substantially parallel to the flows of the fluids and protrudes in directions substantially vertical to interfaces formed by the plurality of fluids.

2 Claims, 7 Drawing Sheets

(56) References Cited

U.S. PATENT DOCUMENTS

| | | |
|---|---|---|
| 2005/0207952 A1 | 9/2005 | Mae |
| 2005/0207953 A1 | 9/2005 | Upadhye et al. |
| 2006/0073080 A1 | 4/2006 | Tonkovich et al. |
| 2006/0140829 A1 | 6/2006 | Tabata et al. |
| 2006/0159601 A1 | 7/2006 | Yamada et al. |
| 2006/0272722 A1 | 12/2006 | Yamada et al. |
| 2007/0062856 A1 | 3/2007 | Pahl et al. |
| 2007/0139451 A1 | 6/2007 | Somasiri et al. |
| 2007/0183933 A1 | 8/2007 | Kawazoe et al. |
| 2007/0256736 A1 | 11/2007 | Tonkovich et al. |
| 2007/0286795 A1 | 12/2007 | Chiba et al. |
| 2008/0226517 A1 | 9/2008 | Vitucci et al. |
| 2008/0245745 A1 | 10/2008 | Ward et al. |
| 2009/0130025 A1 | 5/2009 | Bohmer et al. |
| 2010/0008179 A1 | 1/2010 | Lacy et al. |
| 2010/0068366 A1 | 3/2010 | Tonkovich et al. |

FOREIGN PATENT DOCUMENTS

| | | |
|---|---|---|
| EP | 1 767 268 A1 | 3/2007 |
| JP | A-50-2256 | 1/1975 |
| JP | B-H06-37291 | 5/1994 |
| JP | A-09-512742 | 12/1997 |
| JP | A-10-305488 | 11/1998 |
| JP | A-10-512197 | 11/1998 |
| JP | A-2000-506432 | 5/2000 |
| JP | A-2000-238000 | 9/2000 |
| JP | A-2001-509728 | 7/2001 |
| JP | A-2002-527250 | 8/2002 |
| JP | A-2002-292274 | 10/2002 |
| JP | A-2003-194806 | 7/2003 |
| JP | A-2004-154648 | 6/2004 |
| JP | A-2004-223637 | 8/2004 |
| JP | A-2004-330008 | 11/2004 |
| JP | A-2004-344877 | 12/2004 |
| JP | A-2004-354180 | 12/2004 |
| JP | A-2004-358602 | 12/2004 |
| JP | A-2005-028267 | 2/2005 |
| JP | A-2005-072652 | 3/2005 |
| JP | A-2005-144634 | 6/2005 |
| JP | A-2005-152763 | 6/2005 |
| JP | A-2005-246294 | 9/2005 |
| JP | A-2005-262053 | 9/2005 |
| JP | A-2006-015254 | 1/2006 |
| JP | A-2006-061870 | 3/2006 |
| JP | A-2006-088077 | 4/2006 |
| JP | A-2006-095515 | 4/2006 |
| JP | A-2006-150347 | 6/2006 |
| JP | A-2006-161717 | 6/2006 |
| JP | A-2006-167612 | 6/2006 |
| JP | A-2006-187684 | 7/2006 |
| JP | A-2006-187685 | 7/2006 |
| JP | A-2006-272231 | 10/2006 |
| JP | A-2006-272232 | 10/2006 |
| JP | A-2006-305505 | 11/2006 |
| JP | A-2006-341140 | 12/2006 |
| JP | A-2007-100072 | 4/2007 |
| JP | A-2007-105667 | 4/2007 |
| JP | A-2007-519510 | 7/2007 |
| JP | A-2007-252979 | 10/2007 |
| JP | A-2007-260678 | 10/2007 |
| JP | T-2008-514428 | 5/2008 |
| JP | A-2008-168173 | 7/2008 |
| WO | WO 95/30476 | 11/1995 |
| WO | WO 97/14497 | 4/1997 |
| WO | WO 00/22436 | 4/2000 |
| WO | WO 2006/039568 A1 | 4/2006 |
| WO | WO 2006/046202 A1 | 5/2006 |
| WO | WO 2006087655 A1 * | 8/2006 |

OTHER PUBLICATIONS

Sep. 26, 2011 Office Action issued in Japanese Application No. 2007-275991 (with translation).
May 24, 2011 Office Action issued in Japanese Patent Application No. 2009-063109 (with translation).
Feb. 24, 2011 Office Action issued in Japanese Patent Application No. 2009-063109 (with translation).
Takei et al. "Sub-Nano Litter Micro Batch Operation Systems With Multi-Step Laplace Pressure Valves Prepared by Photocatalytic Analog Lithography", The $10^{th}$ International Conference on Miniaturized Systems for Chemistry and Life Science, Nov. 5-9, 2006, pp. 245-247, Tokyo, Japan.
Hideo Yoshida; "Surface Tension", Proceedings of the TED-COF. '01, Journal Society of Mechanical Engineers, 2001, pp. 1-5.
Oct. 17, 2011 Office Action issued in U.S. Appl. No. 12/196,783.
Miyashita et al. "Sonic Crystal Waveguide—Numerical Simulations and Experiments", Technical Report of The Institute of Electronics, Information and Communication Engineers, Jun. 2001, pp. 33-39 (with abstract).
Mizukoshi et al. "$25^{th}$ Lecture Summary of Surface Science Lecture Convention", The Surface Science Society Japan, Nov. 14, 2005 (with translation).
Jan. 21, 2011 Office Action issued in U.S. Appl. No. 12/185,464.
Jul. 18, 2011 Office Action issued in U.S. Appl. No. 12/185,464.
Xu Ji et al. "A Centrifugation-Enhanced High-Efficiency Micro-Filter with Spiral Channel", Transducers & Eurosensors '07, The $14^{th}$ International Conference on Solid-State Sensors, Actuators and Microsystems, Lyon, France, Jun. 10-14, 2007, pp. 1865-1868.
Oct. 5, 2010 Office Action issued in Japanese Patent Application No. 2008-292428 (with translation).
Jan. 28, 2011 Office Action issued in U.S. Appl. No. 12/422,528.
May 17, 2011 Office Action issued in U.S. Appl. No. 12/422,528.
Nov. 30, 2010 Office Action issued in Japanese Patent Application No. 2006-195904 (with translation).
Aug. 20, 2009 Office Action issued in U.S. Appl. No. 11/783,394.
Jun. 8, 2010 Office Action issued in U.S. Appl. No. 11/783,394.
Mar. 25, 2011 Office Action issued in U.S. Appl. No. 11/783,394.
U.S. Appl. No. 12/196,783 in the name of Tabata et al., filed Aug. 22, 2008.
U.S. Appl. No. 12/575,136 in the name of Takahashi et al., filed Oct. 7, 2009.
U.S. Appl. No. 12/185,464 in the name of Tabata et al., filed Aug. 4, 2008.
U.S. Appl. No. 12/422,528 in the name of Hongo et al., filed Apr. 13, 2009.
U.S. Appl. No. 11/783,394 in the name of Tabata et al., filed Apr. 9, 2007.
Oct. 18, 2011 Office Action issued in Japanese Patent Application No. 2007-266414 (with translation).
Feb. 6, 2012 Office Action issued in U.S. Appl. No. 11/783,394.
Feb. 16, 2012 Office Action issued in U.S. Appl. No. 12/196,783.
Sep. 12, 2013 Office Action issued in U.S. Appl. No. 12/196,783.
Sep. 20, 2012 Office Action issued in U.S. Appl. No. 12/575,136, filed Oct. 7, 2009.
Jan. 23, 2013 Office Action issued in U.S. Appl. No. 12/575,136.
May 10, 2013 Office Action issued in U.S. Appl. No. 12/575,136.
May 22, 2012 Office Action issued in Japanese Patent Application No. 2007-080768 (with translation).
Jul. 25, 2012 Office Action issued in U.S. Appl. No. 11/783,394.
Office Action issued in U.S. Appl. No. 12/196,783 mailed Feb. 12, 2014.

\* cited by examiner

MICRO FLUIDIC DEVICE

CROSS-REFERENCE TO RELATED APPLICATIONS

This application is based on and claims priority under 35 USC 119 from Japanese Patent Application No. 2007-080768 filed Mar. 27, 2007.

BACKGROUND (i) Technical Field

The present invention relates to a micro fluidic device, and more particularly to a micro fluidic device having a micro channel and a method for producing the micro fluidic device.

(ii) Related Art

In micro channel, since fluids are apt to form laminar flows and easily flow, the laminar flows can be formed in which two liquids flow under a state that they are not mixed and kept separated from each other. To increase a contact time between the fluids, the channel needs to be lengthened. In a restricted space, curved places are provided to fold the channel and lengthen the channel. However, in the curved place, a convection called a Dean vortex is generated due to a centrifugal force (see Shinichi Ohkawara and other three members, chemical Engineering Theses, Vol. 30, No. 2, p. 135 to 140 (2004)).

Especially, in the laminar flows having micro particles dispersed, the micro particles move to the outside wall at the curved place so that an unexpected mixture or a mal-distribution of the particles is liable to arise.

SUMMARY

According to an aspect of the invention, there is provided a micro fluidic device comprising a micro channel in which a plurality of fluids form laminar flows and are supplied, wherein an inner wall of the micro channel comprise a protruding part that is substantially parallel to the flow direction of the fluids and protrudes in directions substantially vertical to interfaces formed by the plurality of fluids.

BRIEF DESCRIPTION OF THE DRAWINGS

Exemplary embodiments of the present invention will be described in detail based on the following figure, wherein.

DETAILED DESCRIPTION

A micro fluidic device of the present invention has a micro channel in which a plurality of fluids form laminar flows and are supplied and is characterized in that protruding parts are formed on the inner walls of the micro channel that are substantially parallel to the flow direction of the fluids and protrude in directions substantially vertical to interfaces formed by the plurality of fluids.

Since the micro fluidic device includes the protruding parts formed on the inner walls of the micro channel that are substantially parallel to the flow direction of the fluids and protrude in the directions substantially vertical to the interfaces formed by the plurality of fluids, the laminar flows of the flows are held, and an unexpected mixture or a mal-distribution of particles in the fluids hardly arises. Therefore, the stable laminar flows can be obtained.

The micro fluidic device of the present invention is not especially limited to a use and may be usable for various kinds of well-known uses. A channel length, a flow velocity, a kind of fluid, temperature or the like are preferably suitably selected depending on the use. Specifically, the micro fluidic device may be used as an analyzing device in a medical field, producing, classifying and cleaning devices of micro particles and a chemical reaction device, for instance, a synthesizing device or a polymerizing device.

In the present invention, the micro channel means a very small channel for supplying an extremely small quantity of liquid or gas and the width thereof is located within a range of several µm or more to several thousand µm or smaller. In the present invention, the micro channel means a channel of a micro-meter scale and further includes a channel of a millimeter scale.

The width of the channel may be suitably selected depending on a purpose. A range of 10 µm or more to 1000 µm or smaller is preferable and a range of 20 µm or more to 500 µm or smaller is more preferable.

In the present invention, since the micro channel is of the micro scale, both a dimension and a flow velocity are small. The Reynolds number (Re) of the fluids flowing in the micro channel is 2,300 or smaller. Accordingly, the micro fluidic device having the micro channel of the micro scale is not governed by turbulent flows, but by the laminar flows.

Here, the Reynolds number is represented by a below-described equation. When the Reynolds number is 2,300 or smaller, the micro fluidic device is governed by the laminar flows.

$Re = uL/v$ (u: flow velocity, L: length, v:coefficient of kinematic viscosity)

To maintain governance by the laminar flows, the micro fluidic device of the present invention has the protruding parts formed on the inner walls of the micro channel that are substantially parallel to the flow direction of the fluids and protrude in the directions substantially vertical to the interfaces formed by the plurality of fluids.

In the micro fluidic device of the present invention, the plurality of fluids form the laminar flows and are supplied. In the micro fluidic device, two or more fluids are preferably supplied from a plurality of fluid inlet ports and a merged part forming the laminar flows is preferably provided. Further, the micro fluidic device of the present invention includes one or more outlet ports and preferably has a plurality of outlet ports corresponding to the laminar flows.

In the present invention, the micro channel is a channel that has a very small diameter and is isolated from an outer part by a base material. The base material may be a base board or a tubular material.

In the present invention, the form of the micro channel is not especially limited, however, ordinarily is tubular. Further, a sectional form of the micro channel is not especially limited and any of forms may be employed. As a sectional shape of a plane intersecting at right angles to the axis of a channel of the micro channel, exemplified are a circular form, an elliptical form, a semi-circular form, a rectangular form, a triangular form, other polygonal forms, a tumbler form. However, the present invention is not limited thereto. The sectional shape of the micro channel is preferably rectangular among them, because the micro fluidic device can be easily manufactured.

Further, in the present invention, a part or all of the micro channel includes the protruding parts formed on the inner walls that are substantially parallel to the flow direction of the fluids and protrude in the directions substantially vertical to the interfaces formed by the fluids. That is, in the present invention, the micro channel is preferably a micro channel that has the protruding parts in a part of the inner walls and the rectangular sectional shape.

Further, in the present invention, the shape of the axis of the channel is not especially limited and any of forms such as a straight line or a curve may be employed. Here, the form of the axis of the channel means an axis of a flowing direction of the fluid in the micro channel.

As described above, the shape of the axis of the channel is not especially limited. However, to ensure a channel length for a prescribed area, a curved place is preferably formed. The curved place means a part that changes the direction of a flow by providing a folded shape, a circular arc shape or an angled shape in the axis of the channel of the micro channel. Particularly, in the present invention, the curved place preferably has the circular arc shape. As one example of the circular arc shape, the semi-circular form may be exemplified.

Namely, the form of the axis of the channel entirely includes the straight line part and the curved place and is preferably designed so that the channel length of the micro channel is large in the prescribed area.

The forms of the protruding parts provided on the inner walls of the micro channel are not especially limited, however, they are provided to be substantially parallel to the flow direction of the fluids. In the present invention, the protruding parts are provided to be substantially parallel to the flow direction of the fluids, however, the protruding parts do not need to be exactly parallel to the flow direction of the fluids and an angle can be selected within such a range as not to prevent the flows of the fluids. In the present invention, "substantially parallel to the flow direction of the fluids" means an angle of 10 degrees or smaller with respect to the flow direction of the fluids. The angle is preferably 5 degrees or smaller, more preferably 3 degrees or smaller and furthermore preferably 0 degree with respect to the flow direction of the fluids, namely, parallel to the flow direction of the fluids.

For instance, when the sectional forms of the micro channel vertical to the flow direction of the fluids are rectangular, one protruding part preferably protrudes from one side at right angles to an inner part of the channel. Further, when an opposed protruding part is provided, the other protruding part preferably similarly protrudes at right angles to an opposite side from a corresponding position on the opposite side. Further, as described below, the protruding parts protrude substantially vertically to the interfaces formed by the fluids.

In the present invention, the protruding parts provided in the inner walls of the micro channel protrude substantially in vertical directions to the interfaces formed by the plurality of fluids. In the present invention, the protruding parts are provided substantially vertically to the interfaces formed by the fluids, however, the protruding parts do not need to be exactly vertical to the interfaces, and an angle can be selected within such a range as not to prevent the deformation of the interfaces of fluids. In the present invention, "protrude in the directions substantially vertical to the interfaces formed by the plurality of fluids" means that a deviation from an angle of 90 degrees is an angle of 10 degrees or smaller. The deviation from the angle of 90 degrees is preferably 5 degrees or smaller, more preferably 3 degrees or smaller and furthermore preferably 0 degree with respect to the interfaces formed by the fluids, that is, right angled to the interfaces.

When three or more laminar flows are formed and two or more interfaces are present, the protruding parts may protrude in the directions substantially vertical to at least one interface, however, more preferably protrude in the directions substantially vertical to all the interfaces and the interfaces are preferably formed so as to satisfy the above-described conditions.

As the shapes of the protruding parts, flat plate shapes may be employed, or the height of the protruding parts may be decreased or increased more toward the end of the channel from the inner walls. Further, the height of the protruding parts may be gradually increased or decreased more toward the direction of the axis of the channel. As the shapes of the protruding parts, the protruding parts preferably have the same height from the inner walls to the end of the channel and have the rectangular shapes on the perpendicular plane to the axis of the channel, and rectangular plate forming protruding parts are more preferably provided among them.

Here, the "protruding parts" mean plate-shaped structures that stick out from the inner walls of the channel and extend in the directions of the axis of the channel.

Further, the protruding parts may be provided continuously in the directions of the axis of the channel from the inlet ports to the outlet ports of the channel and may be interrupted halfway.

Further, the protruding parts may be provided at any part of the section of the channel and provided on an upper surface and a lower surface depending on the directions of the interfaces formed by the laminar flows. However, the protruding parts are preferably provided in the direction of the axis of the channel at parts corresponding to the inner walls of an outer peripheral side of the curved places of the channel and the inner walls of an inner peripheral side thereof. Namely, the protruding parts are preferably provided in the inner walls of the channel in the outer peripheral side and the inner peripheral side of the curved places in terms of a centrifugal force. At this time, the laminar flows are formed in the side-by-side manner, which means outer peripheral side and the inner peripheral side.

In the present invention, the protruding parts are preferably provided only in the curved places and more preferably provided only in the inner walls of the outer peripheral side of the curved places of the channel. When the protruding parts are arranged as described above, convection in the curved places can be preferably prevented to more stabilize the laminar flows and restrain the fluids to being mixed.

Only one protruding part may be provided and a plurality of protruding parts may be provided in the inner wall of the channel. Namely, a plurality of parallel protruding parts may be provided on the same section in the channel. In such a case, one or more to five or smaller protruding parts are preferably provided and one or more to three or smaller protruding parts are more preferably provided.

That is, in the present invention, the plurality of protruding parts is preferably provided in the inner walls of the outer peripheral side of the curved places of the channel. Especially, in the case of the micro fluidic device having a plurality of curved places, the plurality of protruding parts are preferably provided in the inner walls of the outer peripheral side of all the curved places.

The height of the protruding part is preferably 50% or smaller as wide as the width of the channel. Here, the "height of the protruding part" means the height of the protruding part when it is assumed that a width from the inner wall of the channel to the inner wall of the channel opposed thereto in the direction vertical to the axis of the channel is set to 100%. The height of the protruding part is more preferably set to 5% or more to 50% or less and furthermore preferably set to 10% or more to 25% or less.

The height of the protruding part is preferably set to 50% or less as wide as the width of the channel so that stable laminar flows can be obtained.

Now, the present invention will be described in detail by referring to FIGS. 1 to 7F.

The same reference numerals used below designate the same components.

Figure 1:
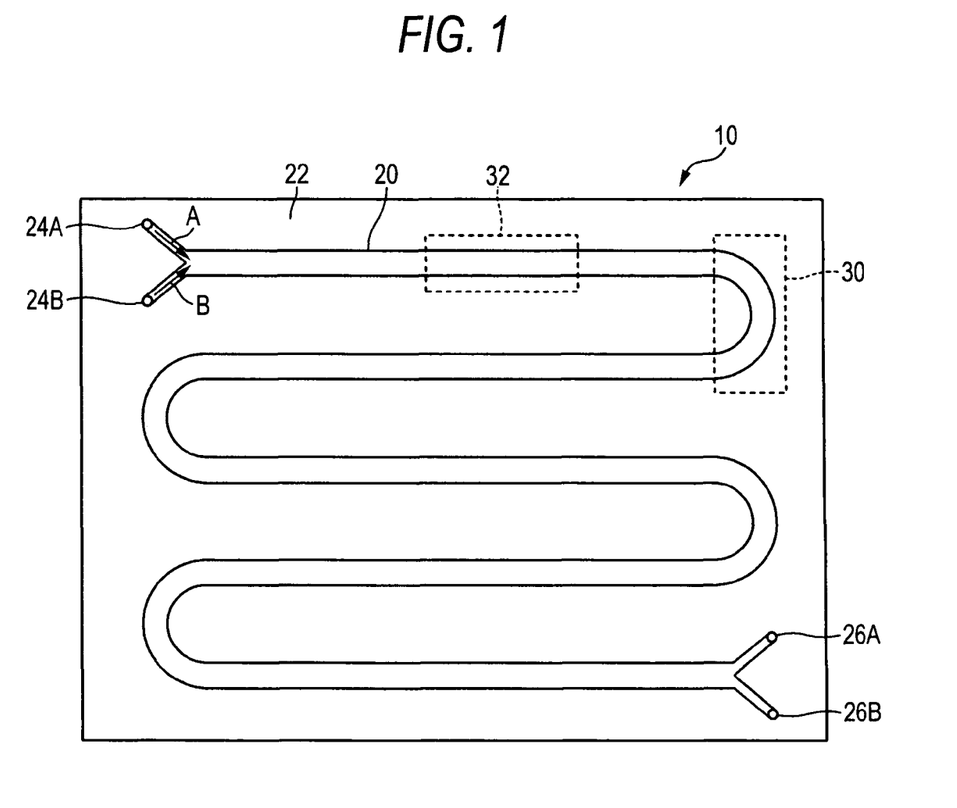
FIG. 1 is a schematic plan view showing an exemplary embodiment of a micro fluidic device of the present invention.

FIG. 1 is a schematic plan view showing a preferred example of the micro fluidic device of the present invention.

In a substrate 22, a micro channel 20 is provided. In the micro channel 20 of the micro fluidic device 10, inlet ports 24A and 24B for introducing a fluid A and a fluid B respectively, and outlet ports 26A and 26B for discharging the fluid A and the fluid B respectively, are provided.

In FIG. 1, an exemplary embodiment for introducing the two fluids is shown, however, the present invention is not limited thereto and three or more fluids may be introduced. Further, one kind of the fluids may be a micro particle dispersion liquid and the micro fluidic device may be used as a classifying device of micro particles or a cleaning device of micro particles. As the fluid, both gas and liquid can be used. In the present invention, as the fluid, the liquid is preferable.

In FIG. 1, the two liquids (the fluid A and the fluid B) are introduced from the inlet ports 24A and 24B and supplied to one micro channel 20 as laminar flows. In FIG. 1, the two liquids (in FIG. 1, the fluid A and the fluid B) supplied to the micro channel 20 subsequently flows in one merged channel as the laminar flows.

Then, the fluid A and the fluid B are respectively discharged from the outlet ports 26A and 26B. In the present invention, the number of the outlet ports is not especially limited and one or more outlet ports may be provided and the number of the outlet ports may be suitably selected depending on its purpose. Further, a plurality of outlet ports may be provided along the channel or the outlet ports may be separately provided on upper and lower parts of the channel.

In FIG. 1, to form the micro channel having a sufficient length on the substrate of the same area, a curved place 30 is provided. Other positions except the curved place form a straight line part 32. However, the micro fluidic device of the present invention is not limited thereto, and, for instance, a curved place such as a zigzag part may be provided.

Figure 2:
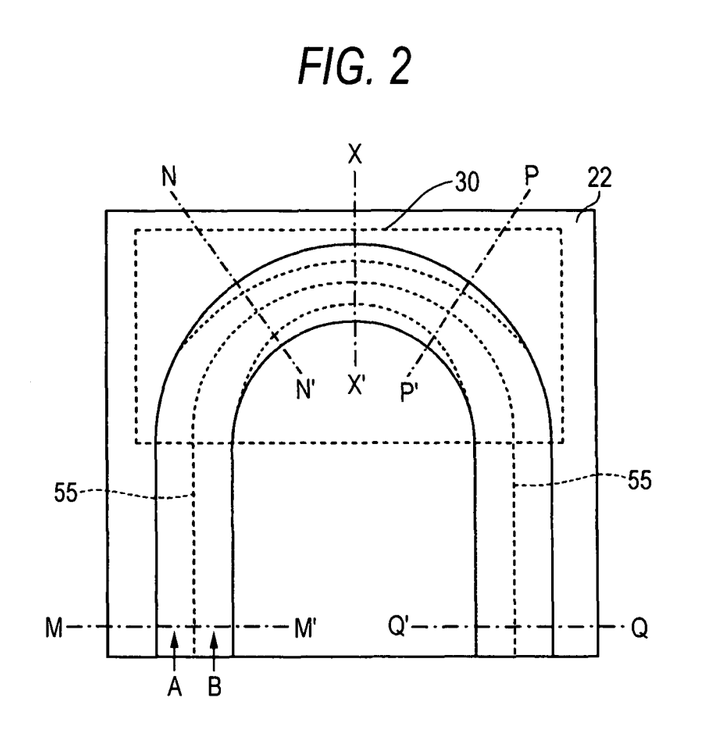
FIG. 2 is an enlarged view including a curved place of the micro fluidic device shown in FIG. 1.

FIG. 2 is an enlarged view including the curved place of the micro fluidic device shown in FIG. 1.

In FIG. 2, the fluid A is supplied in an outer peripheral side of the curved place 30 of the channel and the fluid B is supplied in an inner peripheral side of the curved place 30 of the channel. An interface 55 is formed between the two fluids.

Figure 3A:
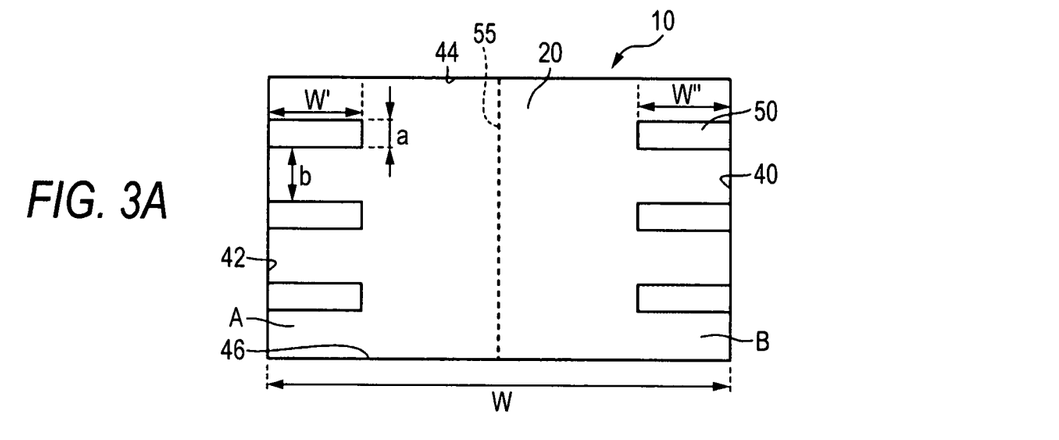
FIGS. 3A to 3C are sectional views taken along a line X-X' of the micro fluidic device shown in FIG. 2.

FIG. 3A shows a cross-sectional view taken along a line X-X' of the micro channel shown in FIG. 2. In FIG. 3A, the micro channel 20 includes an inner wall 40 in the inner peripheral side of the curved place, an inner wall 42 in the outer peripheral side of the curved place, an upper wall 44 and a lower wall 46 and has a channel width W.

In a usual micro channel (see FIG. 3C), since a protruding part is not provided, an unexpected mixture (shown by arrow marks) of a fluid A and a fluid B arises due to a centrifugal force in a curved place so that the fluid A and the fluid B passing the curved place are mixed together in an interface between them.

FIG. 3A shows one example of a cross-sectional view of the micro channel 20 at the curved place 30 of the micro fluidic device 10 of the present invention. Here, the fluid A and the fluid B are supplied and curved from a front side of this sheet to an interior to form the interface 55. In the inner wall 40 in the inner peripheral side at the curved place of the micro channel 20 and the inner wall 42 in the outer peripheral side at the curved place, rectangular plate shaped protruding parts 50 are provided that are parallel to the flow direction of the fluids and vertical to the interface 55.

In FIG. 3A, three pairs of the protruding parts 50 are provided in parallel with the flow direction of the fluids, however, the present invention is not limited thereto. One or more protruding parts 50 may be provided and the number of the protruding parts to be provided may be preferably selected so as to obtain stable laminar flows. Further, as described above, the sectional form of the protruding part may be designed so that the height thereof is increased from the curved place to the inner part of the channel or conversely decreased from the curved place to the inner part of the channel.

Further, the height W' of the protruding part provided in the inner wall in the outer peripheral side at the curved place and the height W" of the protruding part provided in the inner wall in the inner peripheral side at the curved place are preferably respectively 50% or smaller as high as the channel width W, more preferably 5% or more to 50% or less and furthermore preferably 10% or more to 25% or less. The height of the protruding parts is preferably located within the above-described range, so that the stable laminar flows can be maintained.

Further, as W' and W", the same height may be used or different height may be selected.

Further, as shown in FIG. 3A, when the protruding parts are provided in both the opposed inner walls, the total of the height of the protruding parts (W'+W") is preferably 60% or smaller as high as W, more preferably 10% or more to 50% or less, and furthermore preferably 20% or more to 40% or less. The total of the height of the protruding parts is preferably located within the above-described range, so that the stable laminar flows can be formed without decreasing the velocity of the laminar flows.

As shown in FIG. 3A, when the protruding parts are provided in both the opposed inner walls, the opposed protruding parts may be provided at any positions, and may be preferably provided in parallel. That is, the protruding parts are preferably provided so as to have the same height with respect to the direction of height (in FIGS. 3A to 3C, a direction for connecting the upper surface to the lower surface) from the substrate of the micro channel. The protruding parts are preferably arranged as described above, so that the stable laminar flows can be formed.

The thickness a of the protruding part and a space b between the protruding parts can be suitably selected depending on a purpose and preferably suitably selected so as to obtain the stable laminar flows. W'/b is preferably 3 or smaller and more preferably 1.5 or smaller.

Further, as shown in FIG. 3A, when the plurality of protruding parts 50 are provided, the shapes of the protruding parts, the height W' and W" of the protruding parts and the thickness a of the protruding parts may be respectively the same or different and preferably suitably selected. Further, when three or more protruding parts are provided, the space b between the two or more protruding parts may be respectively the same or different and preferably suitably selected.

Figure 3B:
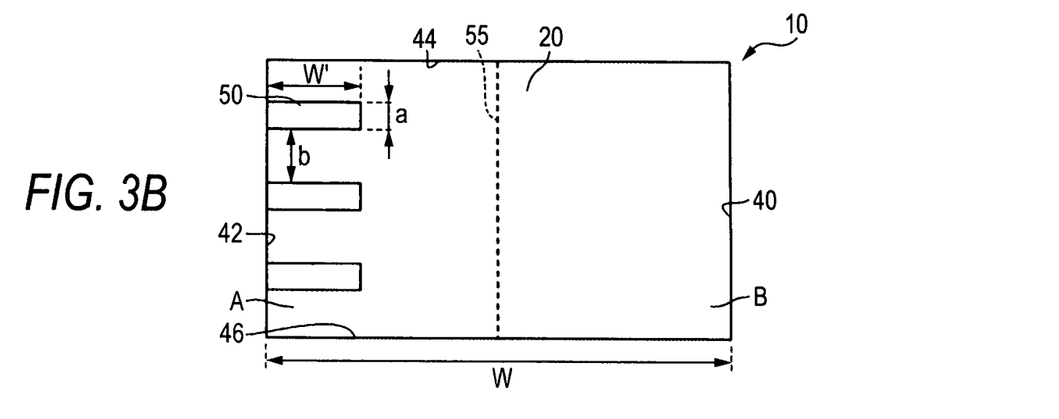
Figure 3C:
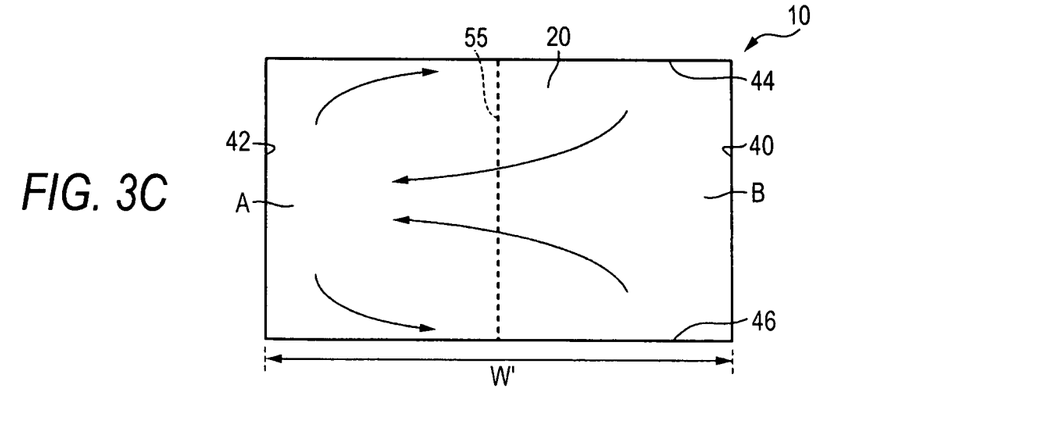

FIG. 3B shows another preferred example of a section taken along a line X-X' of FIG. 2.

In FIG. 3B, the protruding parts 50 are provided only in the inner wall in the outer peripheral side of the curved place. In this case, the height W' of the protruding part 50 is preferably set to 50% or smaller as high as the width W of the micro channel 20. The height W' of the protruding part 50 is preferably located within the above-described range so that a convection due to the centrifugal force can be prevented and the stable laminar flows can be formed.

The above-described preferred height of W' and W" means a maximum height and the maximum height of the protruding parts provided in the micro channel is preferably located within the above-described range. As described below, the protruding part having the maximum height in a central part of the curved place is preferable.

The protruding parts 50 are not limited to the above-described protruding parts and may be provided in the upper surface 44 or the lower surface 46 of the micro channel 20 as described below. However, for the purpose of obtaining the stable laminar flows, the protruding parts 50 are preferably provided in the inner wall 40 in the inner peripheral side of the curved place and/or the inner wall 42 in the outer peripheral side of the curved place as shown in FIG. 3A or FIG. 3B. Especially, as shown in FIG. 3B, the protruding parts are preferably provided in the inner wall 42 in the outer peripheral side of the curved place as shown in FIG. 3B.

In the present invention, the protruding part provided in the curved place is preferably provided in such a way that the height of the protruding part reaches a maximum at the center of the curved place, and the height of the protruding part becomes gradually lower toward the both ends of the curved place.

Figure 4A:
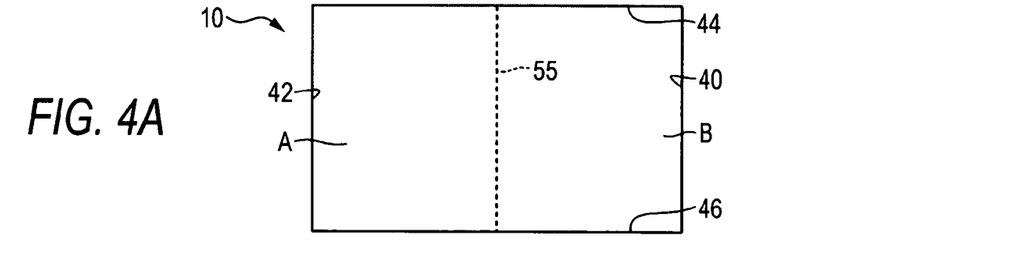
FIGS. 4A to 4E are sectional views of the micro fluidic device shown in FIG. 2.
Figure 4B:
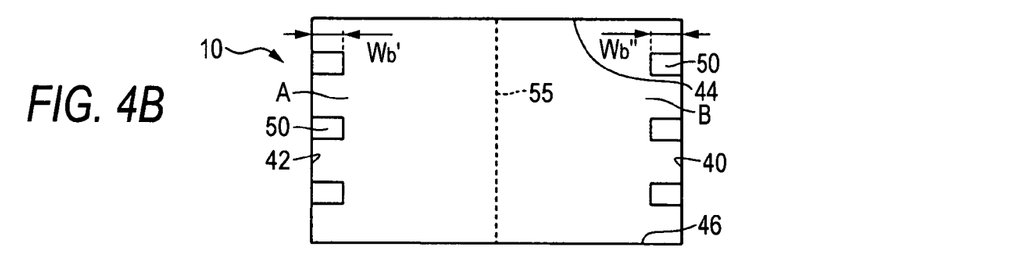
Figure 4C:
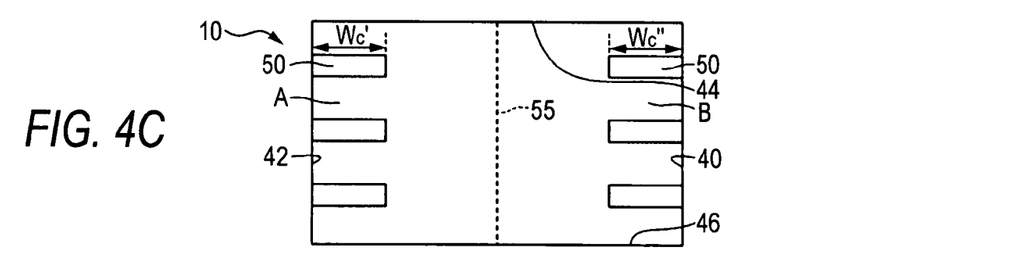
Figure 4D:
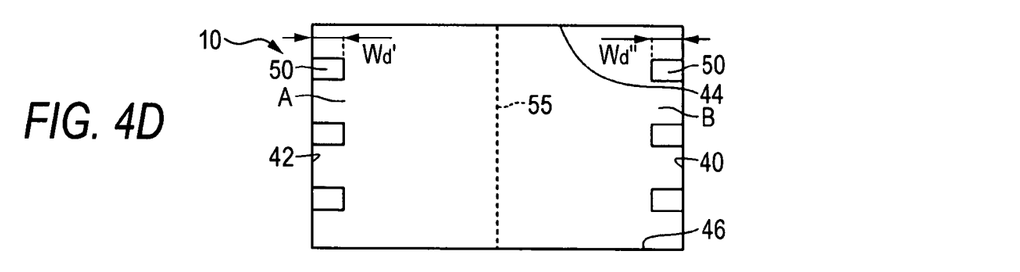
Figure 4E:
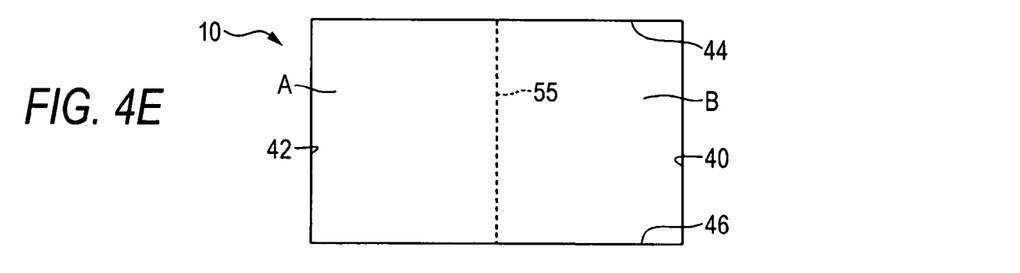

Now, a description will be given by referring to FIG. 4A to 4E. FIGS. 4A to 4E show sectional views of the micro channel shown in FIG. 2. FIG. 4A shows a section taken along a line M-M' before the curved place 30. In this section, the protruding part is not provided. The protruding part is provided so that its height is gradually increased from the part before the curved place. In a section taken along a line N-N' shown in FIG. 4B, the protruding parts having low height are provided. In a section (FIG. 4C) taken along a line X-X' at the center of the curved place, the height of the protruding parts is the highest. Further, the height of the protruding parts is provided so as to be gradually low toward the end of the curved place. In a section taken along a line P-P' shown in FIG. 4D, the protruding parts are provided that have the height lower than that of the section taken along the line X-X'. Further, as shown in FIG. 4E, in a section taken along a line Q-Q' as the finish of the curved place, the protruding part is not provided. Namely, assuming that in the N-N' section, the X-X' section and the P-P' section, the height of the protruding parts provided in the inner wall in the outer peripheral side is respectively Wb', Wc', and Wd' and the height of the protruding parts provided in the inner wall in the inner peripheral side is respectively Wb", Wc", Wd", relations of Wb'<Wc'>Wd' and Wb"<Wc">Wd" are established.

Now, referring to FIGS. 5A and 5B, one exemplary embodiment of the micro fluidic device of the present invention will be described in which two fluids are supplied in upper and lower parts on a section vertical to a direction of an axis of a channel.

Figure 5A:
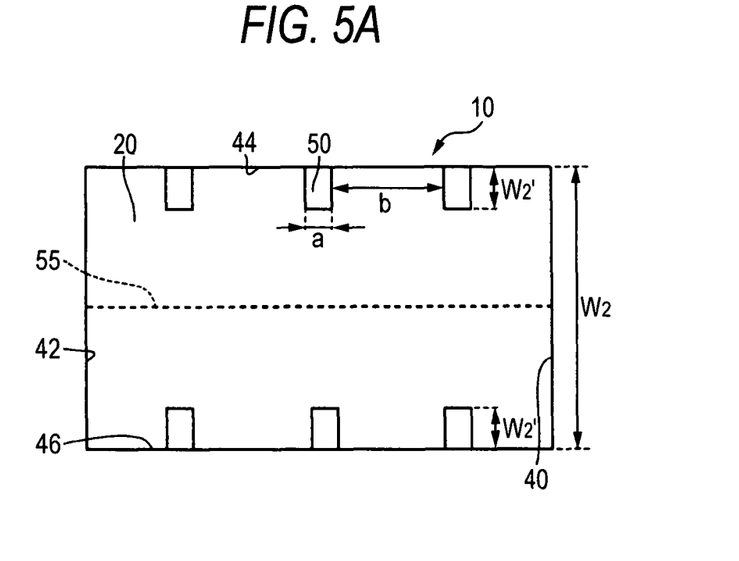
FIGS. 5A and 5B are sectional views showing another example of a curved place in the micro fluidic device of the present invention.

FIG. 5A is another example showing a section of a channel in a curved place of the micro fluidic device of the present invention.

In FIG. 5A, two fluids designated by a fluid A and a fluid B form laminar flows and are curved and supplied from a front side of a sheet surface to an interior. FIG. 5A shows the section of the channel in the curved place and the channel 20 includes an inner wall 40 in the inner peripheral side of the curved place, an inner wall 42 in the outer peripheral side of the curved place, an upper surface 44 and a lower surface 46.

In the inner wall of the channel, protruding parts 50 are provided that protrude in the directions vertical to an interface 55 formed by the fluid A and the fluid B. The protruding parts 50 are formed in parallel with the flow direction of the fluids and curved from the front side of the sheet surface to the interior in FIG. 5A.

The height W2' and W2" of the protruding parts to be formed is respectively 50% or smaller as high as a channel width W2, more preferably 5% or more to 50% or less and furthermore preferably 10% or more to 25% or less. The height of the protruding parts is preferably located within the above-described range, so that the stable laminar flows can be maintained. Further, as W2' and W2", the same height may be used or different height may be selected.

Further, as shown in FIG. 5A, when the protruding parts are provided in both the opposed inner walls, the total of the height of the protruding parts (W2'+W2") is preferably 60% or smaller as high as the width W2 of the channel, more preferably 10% or more to 50% or less, and furthermore preferably 20% or more to 40% or less. The total of the height of the protruding parts is preferably located within the above-described range, so that the stable laminar flows can be formed without decreasing the speed of the laminar flows.

Further, the width a of the protruding part and a space b between the protruding parts can be suitably selected as described above.

Further, when the two upper and lower laminar flows are formed, the height of the protruding parts is preferably provided so as to be maximum in the center of the curved place. The state thereof is described above.

Figure 5B:
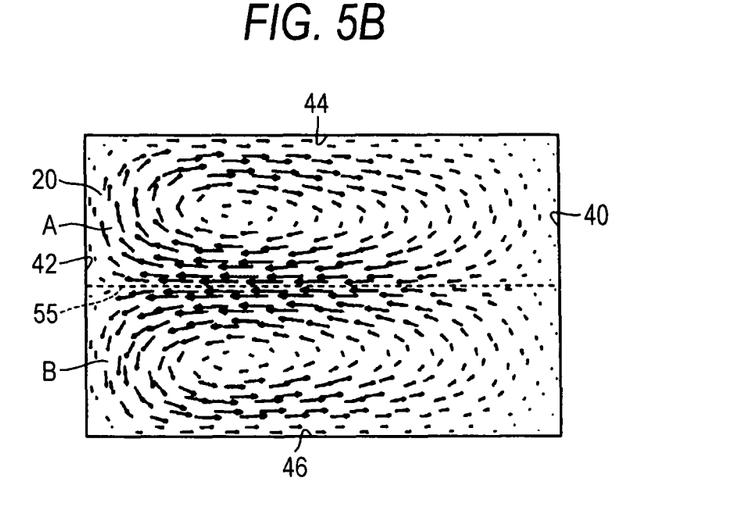

FIG. 5B shows a secondary flow velocity vector generated in the section of the channel shown in FIG. 5A. As shown in FIG. 5A, when the fluids are arranged in the upper and lower parts, a pair of Dean eddies are formed in the upper and lower parts. An area where a secondary flow velocity is the highest is located in the intermediate parts of the upper and lower Dean eddies. In the curved place, since such a secondary flow velocity distribution is generated, especially when particles are included in the fluids, the uneven distribution (mal-distribution) of the particles may possibly arise.

In the present invention, the protruding parts are provided as described above, so that the uneven distribution of the particles can be suppressed and the laminar flows can be formed in a stable way.

In the present invention, the micro fluidic device may be manufactured by any of methods. Now, a method for fabricating the micro fluidic device preferable and usable for the present invention will be described below.

The micro fluidic device of the present invention is preferably formed by laminating thin film pattern members on which prescribed two-dimensional patterns are formed. The thin film pattern members are more preferably laminated under a state that the surfaces of thin films come into direct contact with each other and are bonded together.

As a preferred method for producing the micro fluidic device of the present invention, can be exemplified a method for producing a micro fluidic device comprising:

(i) a step (a donor substrate forming step) of forming a plurality of thin film pattern members respectively corresponding to sectional forms of a predesignated micro fluidic device on the donor substrate; and (ii) a step (a bonding step) of repeatedly bonding the donor substrate on which the plurality of thin film pattern members are formed to and separating the donor substrate from a second substrate to transfer the plurality of thin film pattern members on the second substrate.

The method for producing the micro fluidic device of the present invention will be described in more detail.

(Donor Substrate Forming Step)

In the present invention, a donor substrate is preferably formed by an electro-forming method. Here, the donor substrate indicates a substrate on which the plurality of thin film patterns respectively corresponding to the sectional forms of the target micro fluidic device are formed on the first substrate. The first substrate is preferably made of metal, ceramics or silicon and metal such as stainless steel may be preferably used.

Initially, the first substrate is coated by a thick film photo-resist. The photo-resist is exposed by a photo-mask which includes the sectional forms of the micro fluidic device to be produced. Then the photo-resist is developed. Then, the substrate having the resist patterns is immersed in a plating bath to allow, for instance, a nickel plating to grow on the surface of the metal substrate that is not covered with the photo-resist. The thin film patterns may be formed with copper or nickel by using the electro-forming method.

Then, the resist patterns are removed to form the thin film patterns respectively corresponding to the sectional forms of the micro fluidic device on the first substrate.

Figure 6A:
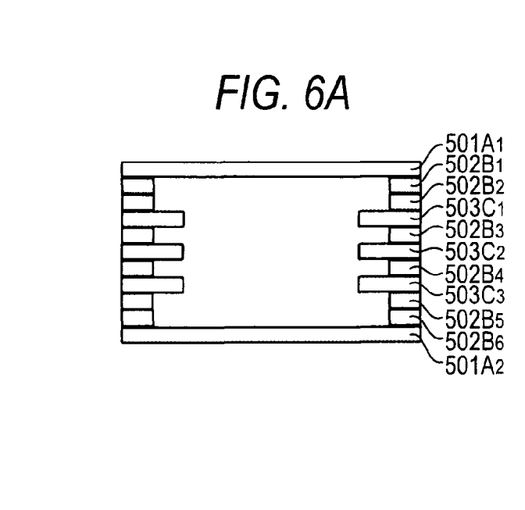
FIGS. 6A to 6C are explanatory views of thin film patterns for forming a part shown in FIG. 2.
Figure 6B:
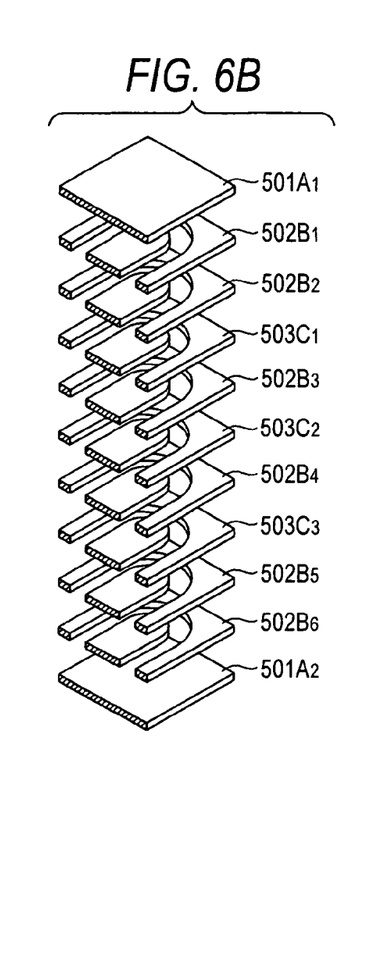
Figure 6C:
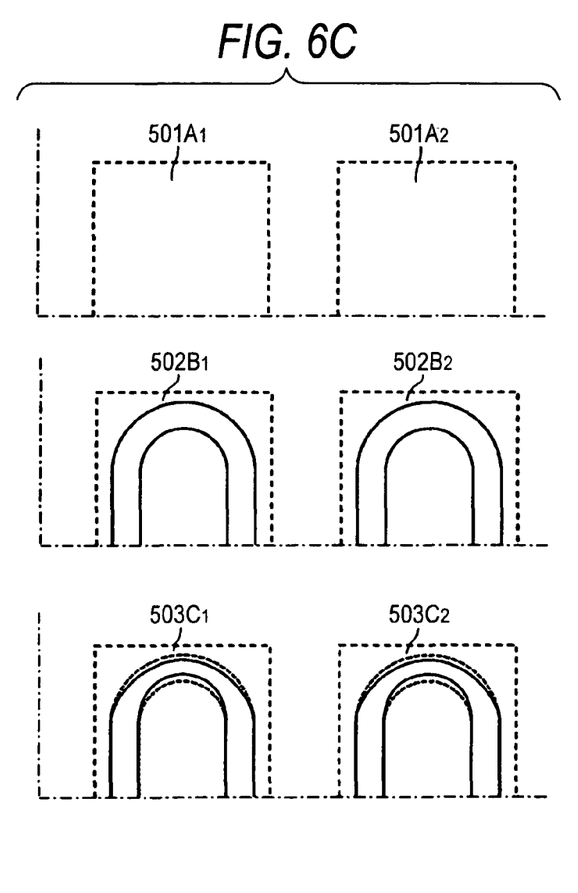

FIGS. 6A to 6C are explanatory views of the thin film patterns for forming the part shown in FIG. 2. FIG. 6A shows a sectional form taken along a line X-X' of the curved place shown in FIG. 2. FIG. 6A and FIG. 6B show that the micro fluidic device having three protruding parts is formed by laminating in order a total of 11 thin film patterns including $501A_1$, $502B_1$, $502B_2$, $503C_1$, $502B_3$, $503C_2$, $502B_4$, $503C_3$, $502B_5$, $502B_6$ and $501A_2$.

FIG. 6C shows only a part of a curved place of the donor substrate. The thin film patterns $501A_1$ and $501A_2$ provided on the first substrate 500 respectively correspond to parts that form the upper surface and the lower surface of a micro channel. The thin film patterns $503C_1$, $503C_2$ and $503C_3$ correspond to parts at which the protruding parts are located. The thin film patterns $502B_1$, $502B_2$, $502B_3$, $502B_4$, ..., correspond to parts of the micro channel in which the protruding parts are not provided.

(Bonding Step)

The bonding step means a step for repeatedly bonding the first substrate (the donor substrate) and the second substrate (the target substrate) and separating the both substrate each other to transfer the plurality of thin film patterns on the donor substrate onto the target substrate. A bonding operation is preferably carried out by a room-temperature bonding method or a surface activated bonding method.

FIGS. 7A to 7F show fabrication process diagrams showing one exemplary embodiment of the method for fabricating the micro fluidic device that can be preferably usable for the present invention.

Figure 7A:
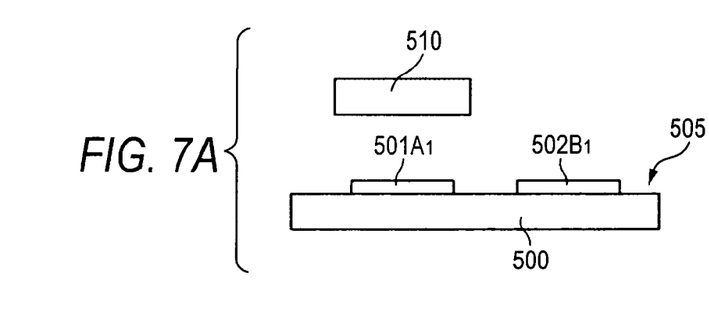
FIGS. 7A to 7F are fabrication process diagrams showing one exemplary embodiment of a method for fabricating a micro fluidic device preferably usable for the present invention.

First, as shown in FIG. 7A, the donor substrate 505 is attached on a lower stage in a vacuum chamber that is not shown in the drawing. The target substrate 510 is attached on an upper stage in the vacuum chamber that is not shown in the drawing. Subsequently, the air in the vacuum chamber is exhausted to obtain a high vacuum state or an ultra-high vacuum state. Then, the lower stage is moved relatively to the upper stage to locate the thin film pattern $501A_1$ of a first layer of the donor substrate 505 just below the target substrate 510. Then, an argon atom beam is irradiated on the surface of the target substrate 510 and the surface of the thin film pattern $501A_1$ of the first layer to clean the surfaces.

Figures 7B, 7C:
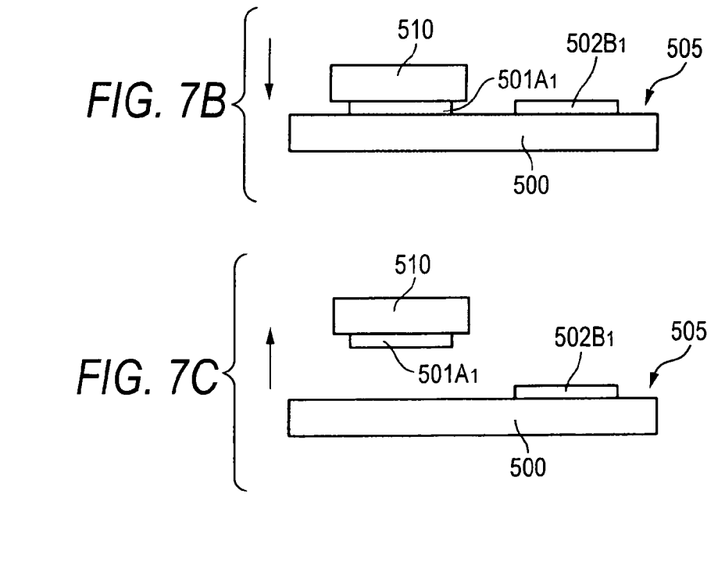

Then, as shown in FIG. 7B, the upper stage is lowered to press the target substrate 510 and the donor substrate 505 for a prescribed time (for instance, 5 minutes) with a prescribed load force (for instance, 10 kgf/cm$^2$) and the target substrate 510 is bonded (a surface activated bonding) onto the thin film pattern $501A_1$ of the first layer under a room temperature. In this exemplary embodiment, the thin film patterns are laminated in order of $501A_1$, $502B_1$, $502B_2$, $503C_1$, $502B_3$, $503C_2$, $502B_4$, $503C_3$, $502B_5$, $502B_6$ and $501A_2$.

Then, as shown in FIG. 7C, when the upper stage is lifted to separate the donor substrate from the target substrate, the thin film pattern $501A_1$ of the first layer is peeled off from the first substrate (the donor substrate) 500 and transferred to the target substrate 510 side. This phenomenon arises, because an adhesive strength between the thin film pattern $501A_1$ and the target substrate 510 is larger than an adhesive strength between the thin film pattern $501A_1$ and the first substrate (the donor substrate) 500.

Figure 7D:
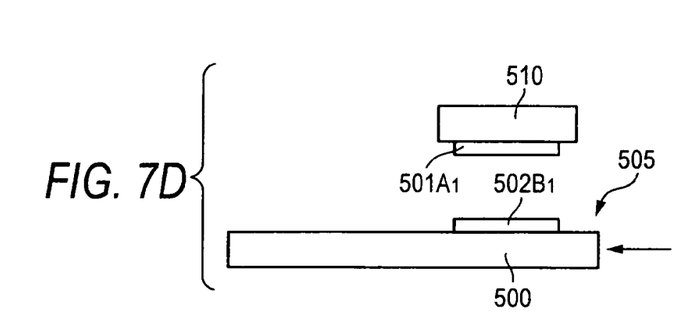

After that, as shown in FIG. 7D, the lower stage is moved to locate the thin film pattern $502B_1$ of a second layer on the donor substrate 505 just below the target substrate 510. Then, the surface of the thin film pattern $501A_1$ (a surface which was in contact with the first substrate 500) transferred to the target substrate 510 side and the surface of the thin film pattern $502B_3$ of the second layer are cleaned as described above.

Figure 7E:
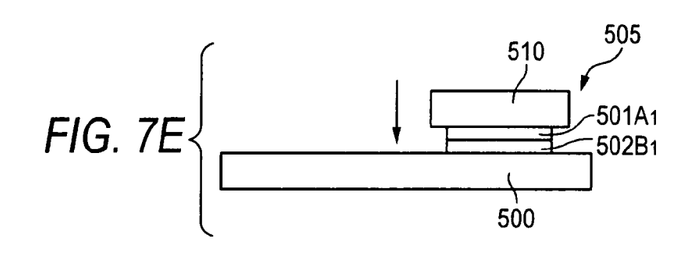
Figure 7F:
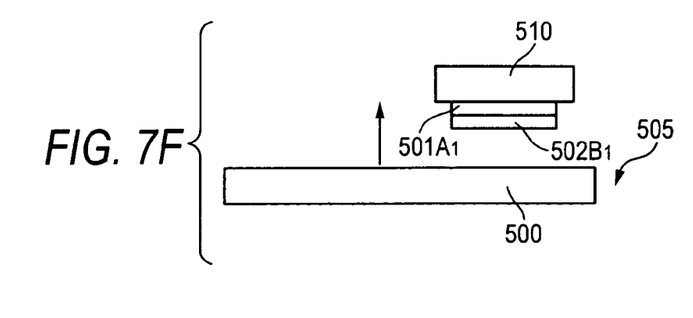

Then, as shown in FIG. 7E, the upper stage is lowered to bond the thin film pattern $501A_1$ of the first layer to the thin film pattern $502B_1$ of the second layer. As shown in FIG. 7F, when the upper stage is lifted, the thin film pattern $502B_1$ of the second layer is peeled off from the metal substrate (the first substrate) 500 and transferred to the target substrate 510 side.

The donor substrate 505 and the target substrate 510 are repeatedly positioned, bonded to and separated from each other so that the plurality of thin film patterns such as other thin film patterns ($502B_2$, $503C_1$, $502B_3$, $503C_2$, $502B_4$, $503C_3$, $502B_5$, $502B_6$ and $501A_2$) respectively corresponding to the sectional forms of the micro fluidic device are transferred to the target substrate. When a laminated body transferred to the target substrate 510 is detached from the upper stage and the target substrate 510 is removed, the micro fluidic device shown in FIGS. 6A to 6C is obtained.

The present invention is not limited to the above-described exemplary embodiment and may be variously modified within a range without departing the gist of the present invention. The components of the exemplary embodiments may be arbitrarily combined within the range without departing the gist of the present invention.

In the above-described exemplary embodiments, the donor substrate is manufactured by using the electro-forming method, however, the donor substrate may be formed by using a semiconductor process. For instance, a substrate made of a Si wafer is prepared. On this substrate, a mold releasing layer made of polyimide is formed by a spin coating method. On the surface of the mold releasing layer, an Al thin film as a component material of a micro fluidic device is formed by a sputtering method. The aluminum thin film is patterned by a photo-lithography method so that the donor substrate can be formed.

What is claimed is:

1. A micro fluidic device, for use with a plurality of fluids, comprising:
  a substrate;
  a plurality of thin film pattern members formed on the substrate, the thin film pattern members comprising nickel, an alloy including nickel as a main component, copper or an alloy including copper as a main component;
  a plurality of inlet ports;
  a plurality of introduce channels to which the inlet ports are connected; and
  a micro channel, formed on the substrate, to which the introduce channels are joined so as to form a division between the introduce channels perpendicular to a plane on which the substrate extends, and defining an inner wall of the micro channel, the micro channel including:
  a curved portion having a first end, a second end, and a center disposed between the first and second ends;
  a plurality of protruding parts connected to the inner wall of the micro channel extending beyond the inner wall in a direction substantially parallel to the plane on which the substrate extends, each extending from the first end of the curved portion to the second end of the curved portion on a plane substantially parallel to the plane on which the substrate extends, and protruding in a direction substantially parallel to the plane on which the substrate extends, wherein
  the heights of the plurality of protruding parts increase as the plurality of protruding parts extend from the first end of the curved portion to the center of the curved portion;
  the plurality of protruding parts are provided only in the inner wall of an outer peripheral side of the curved portion of the micro channel;
  the heights of the plurality of protruding parts decrease as the plurality of protruding parts extend from the center of the curved portion to the second end of the curved portion;
  the heights of the plurality of protruding parts at the center of the curved portion are greater than the heights of the plurality of protruding parts at the first and second ends of the curved portion; and
  the heights of the plurality of protruding parts are 50% or smaller than a width of the micro channel.

2. A micro fluidic device according to claim 1, wherein the micro fluidic device is formed by laminating thin film pattern members.

* * * * *